Oct. 13, 1959  B. M. GORDON ET AL  2,908,900
INDICATING DEVICE
Filed May 14, 1956  2 Sheets-Sheet 2
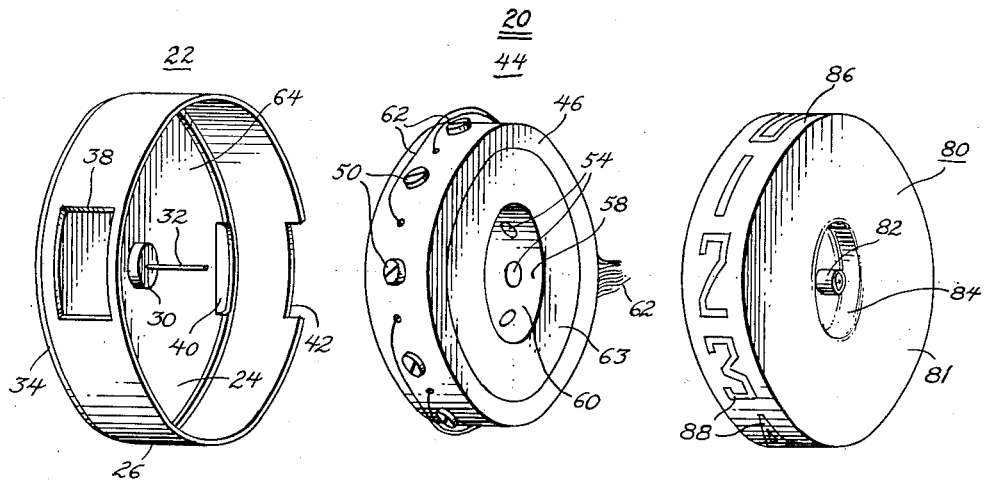
Fig. 5.
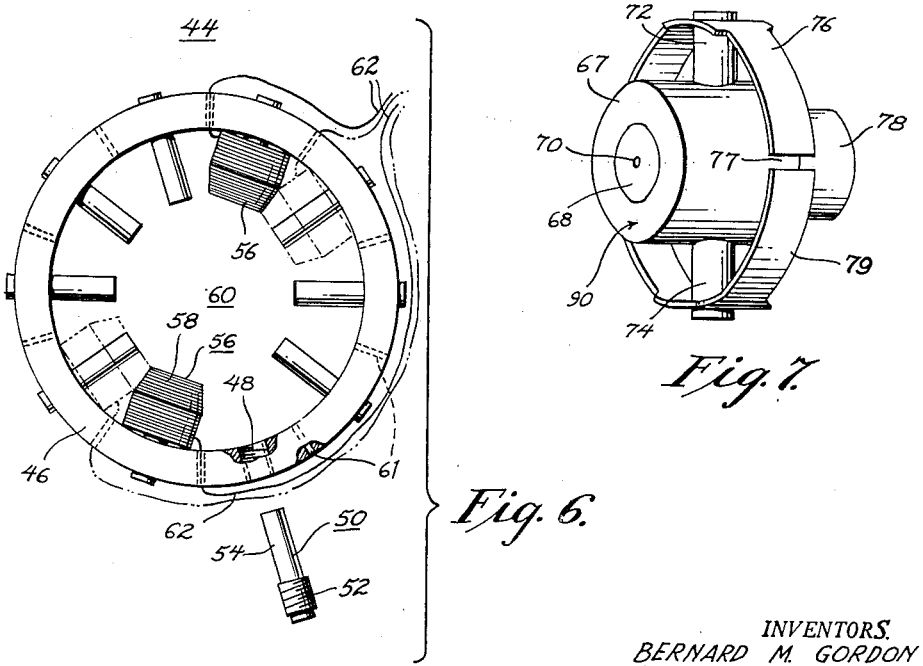
Fig. 6.
Fig. 7.
INVENTORS.
BERNARD M. GORDON
BY RANDALL L. GIBSON
Jacob Trachtman
ATTORNEY.

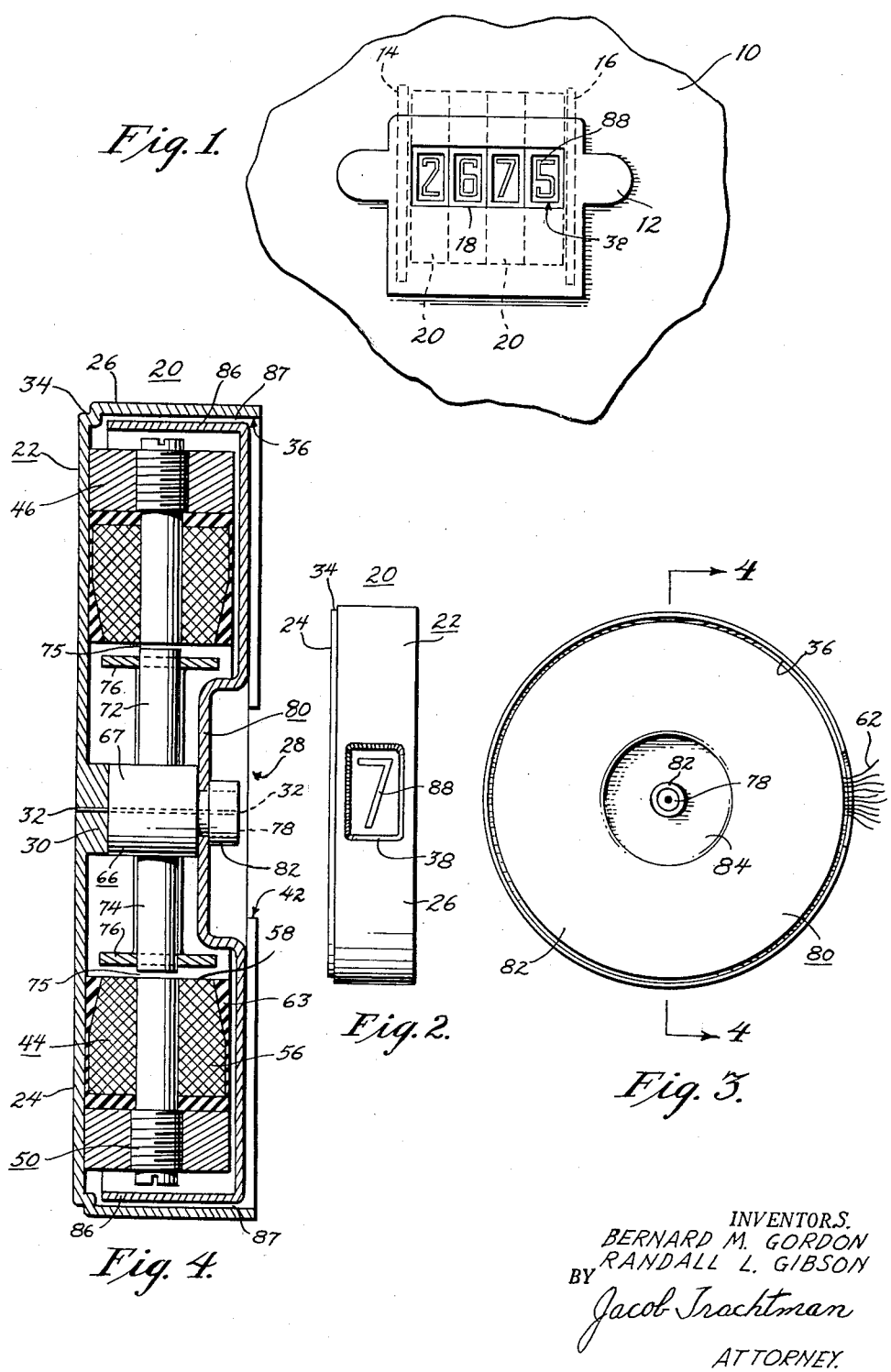

United States Patent Office 2,908,900
Patented Oct. 13, 1959

2,908,900

INDICATING DEVICE

Bernard M. Gordon, Newton, and Randall Lee Gibson, Boston, Mass., assignors to Epsco, Incorporated, Boston, Mass., a corporation of Massachusetts Application May 14, 1956, Serial No. 584,803

2 Claims. (Cl. 340—319)

The invention relates to indicating devices, and more particularly to indicating devices of the electro-magnetic type.

Heretofore, indicating devices have utilized drums bearing information which were positioned by mechanical linkages or have used complex servo-controlled mechanisms to provide the desired indication. The present invention is an improvement over such devices in that information in electrical coded form produces a discrete orientation of the indicating drum in a simple and efficient manner to provide the desired indication.

Therefore, it is the primary object of the invention to provide a new and improved indicating device which by simple means converts electrical information to a corresponding discrete position of a drum presenting the desired information.

Another object of the invention is to provide a new and improved indicating device utilizing an electro-magnetic field for discretely positioning an indicating body to correspond with the electrical information presented.

Another object of the invention is to provide a new and improved indicating device presenting in visual form information delivered to it in electrical form.

Another object of the invention is to provide a new and improved indicating device which visually presents an indication corresponding with the electrical signals delivered to it and which maintains this indication after deenergization until new information is delivered.

Another object of the invention is to provide a new and improved indicating device for visual presentation of data which device is compact in structure and efficient in operation.

Another object of the invention is to provide a new and improved indicating device which is inexpensive to manufacture and low in cost.

The above objects as well as many others are achieved by the invention by forming an indicating device comprising a stator body having a ring unit providing a magnetic path, a plurality of pole elements secured with and radially extending from the unit towards the center of the unit, and a plurality of coil members received about the pole elements. The pole elements and coil members form a central region within the ring unit, and provide a magnetic field of force in the central region which assumes one of a plurality of predetermined discrete orientations determined by selective energization of the coil members. The discrete orientations of the field are angularly displaced from each other about the common center.

A rotor body having a magnetic element is received within the central region of the stator body and is controlled by the magnetic field to assume one of a plurality of predetermined discrete positions with respect to the stator body. The discrete positions of the rotor body are angularly displaced from each other about the common center and are determined by the particular orientations of the field.

An indicating means which is secured with the rotor body provides information which is determined by the relative position of the rotor and stator bodies.

The foregoing and other objects of the invention will become more apparent as the following detailed description of the invention is read in conjunction with the drawings, in which:

Figure 1 is a fragmentary front view of a panel illustrating the mounting of an indicating assembly embodying the invention, Figure 2 is an enlarged front elevational view of the indicating device shown in Figure 1, Figure 3 is a side elevational view of the device shown in Figure 2, Figure 4 is an enlarged sectional view taken on the line 4—4 of Figure 3, Figure 5 is an exploded view of the device shown in Figure 2, Figure 6 is a side elevational view of the ring unit partially assembled and with portions broken away, and Figure 7 is an enlarged perspective view showing in detail the magnetic elements of the rotor body.

Like numerals designate like parts throughout the several views.

Refer to Figure 1 which discloses a panel 10 supporting on its front surface a plate 12 which is provided with a pair of parallel indicator retaining members 14 and 16. The panel 10 and the front plate 12 are provided with aligned openings forming a viewing window 18. The supporting members 14 and 16 retain between them a plurality of indicating devices 20. The devices 20 provide information which may be viewed through the window 18.

One of the identical indicating devices 20 shown in Figure 1, will be described in detail in connection with the Figures 2 to 7 inclusive.

The indicating device 20 comprises a cylindrical casing 22 having a circular side portion 24 and a cylindrical peripheral portion 26 forming within it a cavity 28. The circular side portion 24 of the casing 22 is provided with a central hub 30 which extends into the cavity 28. An axle 32 is centrally secured with the hub portion 30 of the casing 22 and extends perpendicular to the side portion 24 into the cavity 28.

The casing 22 is provided with an annular groove or recess 34 allowing it to engage an adjacent casing 22 at the inner surface 36 of its cylindrical rim portion 26. This results in enclosing the cavity 28 of the adjacent casing 22 as well as structurally connecting the adjacent casings 22. In this manner, a plurality of casings 22 may be interengaged as shown in Figure 1 and supported at their ends by plates 14 and 16 to form a composite indicating assembly with any desired number of indicating units 20.

The rim portion 26 of the casing 22 is provided with a window 38 having a beveled edge, while conductor communicating openings 40 and 42 (see Figure 5) are respectively provided in the side and rim members 24, 26.

A stator body 44 comprises a ring unit 46 which is made of material having magnetic conducting properties. The ring unit 46 is provided with a plurality of radially disposed threaded openings 48 which are equally spaced about the ring unit 46. Each of the openings 48 receives a pole element 50 by engaging its threaded end 52 with its other end 54 extending radially from the ring unit 46 towards its center. A plurality of electro-magnetic coil elements 56 are respectively received about the ends 54 of the pole elements 50. The ends 58 of the coil elements 56 are conical in form each having its apex directed toward the center of the ring unit 46. Because of the size and configuration of the coil elements 56, adjacent ones must be positioned before their pole elements 50 are secured with the ring unit 46. When all of the coils 56 and the pole elements 50 are secured in position, the tapered or conical portions 58 of the coils 56 contact adjacent coils 56 preventing their removal without the removal of appropriate pole elements 50, thereby securely fixing them in position.

When the pole elements 50 and their coils 56 are in position, a central region or space 60 is formed within the stator body 44.

The ring unit 46 is also provided with a plurality of radially directed openings 61 intermediate the openings 48 which receive through them conductors 62 from the coils 56 which pass around the outside of the ring unit 46 to join the other conductors 62. The coils 56 assembled upon the core elements 50 within the ring unit 46 may be protected and made more rugged by the application of a potting compound 63. This provides a rugged stator assembly with an outer ring unit 46 providing structural strength and leaving a central region 60 with the ends of the pole elements 50 exposed.

The stator body 44 is secured within the cavity 28 of the casing 22 by causing it to adhere to the inner surface of the side portion 24 or in any other such manner. The stator body 44 is secured in a position concentric with the axle 32 which passes through the center of the central region 60 of the stator body 44.

A rotor body 66 (Figure 7) has a cylindrical hub portion 67 with a central bearing core 68 provided with a central opening 70 which receives and revolves about the axle 32 of the casing 22. The hub 67 of the rotor body 66 has a pair of magnetic elements 72, 74 secured with it and radially extending therefrom in opposite directions. The outwardly extending ends of the magnetic elements 72, 74 are of opposite polarities. A pair of substantially semi-circular band members 76 and 79 are concentrically positioned about the hub 67 of the rotor body 66 by respectively being secured with the extending ends of opposite polarities of the magnetic elements 72 and 74. The members 76 provide a pair of magnetic shunt paths between the ends of the magnetic elements 72, 74 and are spaced to form a pair of opposite air gaps, only one 77 being visible in Fig. 7, in the shunt paths at quadrature with the ends of said elements 72, 74. The hub 67 is provided with a concentric cylindrical extending portion 78 at one of its ends.

An indicating wheel 80 (Figures 4 and 5) is provided with a circular side portion 81 having a central indented region 84. The indented region 84 is provided with a central opening which receives through it the extending portion 78 of the rotor body 66. The rotor body 66 is firmly secured with the indicating wheel 80 by a retaining sleeve 82 which is press fitted over the extending portion 78 of the rotor 66 and clamps the indicating wheel 80. The indicating wheel 80 has a cylindrical rim portion 86 which is concentrically positioned about the stator body 66. The outside surface of the rim portion 86 is provided with indicia such as the evenly spaced numerals 88.

The assembly of the rotor body 66 secured with the indicating wheel 80 are rotatably received about the axle 32 within the cavity 28 of the casing 22. In this position, as clearly shown in Figure 4, the rotor body is received within the central region 60 of the stator body 44, while the indicating wheel 80 has its rim portion 86 received between the cylindrical portion 26 of the casing 22 and the outside of the stator body 44. The end surface 90 of the hub 67 of the rotor body 66 abuts the hub 30 of the casing 22 which provides a bearing surface. The magnetic elements 72 and 74 of the rotor body 66 are in alignment with the radial plane of the pole elements 50 providing a small gap or clearance 75 between them when proximately positioned.

When a plurality of units 20 are assembled, a sufficient clearance is also provided between the indicating wheel 80 and the circular side plate 24 of an adjacent device 20 received within the open end region 36 of the casing 22. The conductors 62 energizing the coils 58 pass around the outside of the ring unit 46 and pass out through the opening 40 (Figure 5) in the portion 24 and the opening 42 in the adjacently positioned casing 22.

Although the ring unit 46 and the casing 22 are illustrated as stationary while the rotor body 66 and indicating wheel 80 are rotatable with respect thereto, the invention may be incorporated in a structure in which these functions are reversed providing a stationary indicating wheel.

As illustrated, the stator body 44 is provided with five pairs of opposite pole elements 50 and associated coils 56. Each of the coils 56 is provided with a winding which is connected in series with the winding of its opposite coil 56. This arrangement provides opposite polarities at the ends of each pair of poles 50 when energized by their coils 56. The polarities of the ends of any pair of pole elements 50 may be reversed by reversing the flow of current in the conductors 62 to their respective coils 56.

Thus, by energizing a pair of opposite coils 56, a magnetic flux is created which flows from one pole element 50 to the opposite pole element 50 through the two semi-circular paths provided by the ring unit 46. The magnetic circuit is completed by the flux passing through the central region 60 between the opposite ends of the pair of pole elements carrying the energized coils 56. This creates a magnetic field of force in the central region 60 of the stator body 44. The field of force created in the central region 60 has in this case, ten discrete orientations depending upon which pair of coils 56 are energized and the direction and flow of current in the coils 56.

In the unit 20, the ten discrete orientations of the magnetic field of force in the central region 60 act upon the rotor body 66 causing it to assume a discrete rotational position with respect to the stator body 44 and the casing 22 as determined by the orientation of the field within the region 60.

Thus, for example, when an opposite pair of coils 26 are energized the field created in the region 60 causes the rotor body 66 to assume a position in which its magnetic elements 72, 74 are respectively positioned proximate to pole elements 50 bearing the energized coils 56. The magnetic elements 72, 74 of the rotor body 66 will be attracted by and positioned proximate the pole elements 50 of opposite polarities. Thus, if the energization of a pair of coils 56 is reversed the rotor body 66 will be caused to revolve 180 degrees to assume its new position caused by the reversal of the field orientation.

When the rotor body, upon energization of a pair of coils 56, assumes its proper position as determined by the field of force, a magnetic path through the elements 72, 74 is provided between the opposite pole elements 50. Thus, if the energization of the coils 56 ceases, the rotor body 66 will maintain its set position due to the magnetic path provided for the flux of the permanent magnet elements 72, 74 which passes through the adjacent pole elements 50 and the ring unit 46. The reluctance torque opposes the rotation of the rotor 66 from its set position. By this means the rotor body 66 is maintained in its set position until another field of force is created having a differing orientation. A field of force with a differing orientation produces a reactance torque upon the rotor body 66 which is sufficient to overcome the reluctance torque tending to maintain the rotor body 66 in its previously set position. The rotor body 66 now assumes its new position corresponding to the orientation of the field which it retains until it is again energized by the field of force. Thus, the rotor body 66 may be positioned by momentarily energizing the device 20 to assume the desired position of the rotor body 66 after which energization may be removed and is not required except to reposition the rotor body 66.

The band members 76 and 79 which provide shunt paths for magnetic flux with gaps 77 between the ends of opposite polarities of the magnetic elements 72 serve an important function. This is to distribute and alter the field of the rotor body magnetic elements 72, 74 so that a sufficient reaction torque is produced by the field of the stator irrespective of the position of the rotor body with respect to the orientation of the field of the stator body 44. Beside inducing rotation in position where the reactance torque might otherwise be minimum, the band members 76 of the rotor body 66 by forming gaps 77 reduce the reluctance torque, so that the rotor body 66 is not held so strongly in any of its said positions to prevent rotation of the rotor body 66 responsive to the reorientation of the field of the stator body 44. Because of this effect, the rotor body 66 is easily and effectively repositioned by energization of the field of the stator body 44, and sufficient reluctance torque is retained to maintain the rotor body 66 in its set position when the field of the stator 44 is deenergized.

The rotor body 66 is secured with the indicating wheel 80 which therefore is also caused to move with the rotor body 66 relative to the stator body 44 and the casing 22.

In conformance with the ten equally spaced rotational positions of the rotor body 66, the indicating wheel 80 is provided with ten equally spaced characters or numerals 88 about the outside of its cylindrical rim 86. By this arrangement, the assumption of one of the discrete positions of the rotor body 66 causes a corresponding positioning of one of the numerals 88 opposite the window 38 of the casing 22. Thus, one of the ten numerals zero to nine will be visible through the window 38, with no intermediate position between two adjacent numerals being possible or desirable in this case. In this manner the electrical information delivered to the indicating device 20 by the energization of its conductors 62 causes the information to be translated into visible form which in this case is a numerical representation. This is achieved without mechanical linkages and complex structures, but by utilizing discrete orientations of a magnetic field which are particularly determined by the electrical information presented.

The Figure 1 illustrates a plurality of the indicating devices 20 arranged respectively to present digits at the window 18 in the unit, ten, hundred and thousand positions.

Although the invention has been particularly described with the use of five pairs of energizing coils, each pair of which is exclusively energized for conditioning the information delivered by the indicating device, many other arrangements may be utilized for converting differently coded information derived from systems having different numbers of output conductors, and the simultaneous energizations of various combinations of such conductors. The indicating device 20, therefore, may be utilized for decoding information presented to it in various forms for visual data presentation. For this purpose, the device also may be arranged with coils having numerous windings so that exitation of both windings nullifies the magnetic effect produced by the coil. A system of coil arrangement may also be utilized which may produce fields with discrete orientations which are the resultant of the energization of one or a plurality of coils.

It is also foreseen that a rotor body 66 may be provided with one or more magnetic elements for use in combination with a stator body of the type described.

It will be obvious to those skilled in the art that the invention may find wide application with appropriate modification to meet the individual design circumstances, but without substantially departing from the essence of the invention.

What is claimed is:

1. An indicating device comprising a first body, means for producing a magnetic field of force which controllably assumes a selected one of a plurality of predetermined discrete orientations with respect to said first body; the discrete orientations of said field being angularly displaced from each other about a common center; a second body having a magnetic element with ends of opposite polarities supported with respect to said first body to permit relative angular movement between said first and second bodies and a pair of substantially semi-circular segment members offering negligible opposition to magnetic flux flow respectively secured with the ends of said element and providing a pair of shunt magnetic paths from one end to the other end of said element with opposite gaps intermediate said ends, said gaps offering much greater opposition to magnetic flux flow than said semi-circular members, the distance across said gap being much less than the path length of magnetic flux through said semi-circular segment members, the relative orientation between said first and second bodies being determined by the discrete orientation of said magnetic field of force, said first body completing a magnetic path passing through said second body whereby said relative orientation is retained upon removal of said magnetic field of force.

2. An indicating device comprising a cylindrical casing provided with an indicating window, and a central shaft; a stator body centrally secured within said casing having a ring unit providing a magnetic path, a plurality of opposing pairs of pole elements equally spaced about and radially extending from said unit toward the center of said unit, and a plurality of pairs of coils respectively received about said pairs of pole elements; said pole elements and coil members forming a central region within said ring unit; said stator body producing a magnetic field of force in said central region which controllably assumes one of a plurality of discrete orientations each determined by the energization by a respective pair of said coil members; each pair of said coil members being energized to produce opposite polarizations of the inwardly extending ends of their pole elements; a rotor body rotatably mounted on the shaft of said casing and having an elongated magnetic element with end of opposite polarities received within the central region of said stator body and controlled by said magnetic field to assume the discrete position with respect to said stator body in which the ends of said magnetic element are respectively proximate the oppositely polarized pole elements respectively energized by their coil members and completing a magnetic path through said ring unit, and a pair of substantially semi-circular segment members offering negligible opposition to magnetic flux flow respectively secured with the ends of said element and providing a pair of shunt magnetic paths from one end to the other end of said element with opposite gaps intermediate said ends; said gaps offering much greater opposition to magnetic flux flow than said semi-circular members, the distance across said gaps being much less than the path length of magnetic flux through said semi-circular segment members, said completed magnetic path through said unit maintaining said rotor body in said discrete position when said coil members are de-energized; and an indicating wheel secured with said rotor body and having a cylindrical rim bearing information characters received within said casing with a selected character appearing at the window of said casing determined by the relative positions of said stator and rotor bodies.

References Cited in the file of this patent
UNITED STATES PATENTS

| | | |
|---|---|---|
| 594,979 | Barrett | Dec. 7, 1897 |
| 1,058,545 | Caldwell | Apr. 8, 1913 |
| 1,178,128 | Britton | Apr. 4, 1916 |
| 1,301,050 | Hagman | Apr. 15, 1919 |
| 1,504,609 | Crane | Aug. 12, 1924 |
| 1,519,675 | Ford | Dec. 16, 1924 |
| 1,581,383 | Butusoy | Apr. 20, 1926 |